(12) United States Patent  
Parris

(10) Patent No.: US 7,646,952 B2
(45) Date of Patent: Jan. 12, 2010

(54) OPTICAL FIBER CABLE HAVING RAISED COUPLING SUPPORTS

(75) Inventor: Don Parris, Newton, NC (US)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 12/146,535

(22) Filed: Jun. 26, 2008

(65) Prior Publication Data

US 2009/0003779 A1    Jan. 1, 2009

Related U.S. Application Data

(60) Provisional application No. 60/946,752, filed on Jun. 28, 2007.

(51) Int. Cl.
*G02B 6/44* (2006.01)

(52) U.S. Cl. ...................... 385/103; 385/102

(58) Field of Classification Search .......... 385/100–114
See application file for complete search history.

(56) References Cited

U.S. PATENT DOCUMENTS

| | | | |
|---|---|---|---|
| 3,879,575 A | 4/1975 | Dobbin et al. | |
| 4,464,013 A | 8/1984 | Sabia | |
| 4,497,538 A | 2/1985 | Patel | |
| 4,709,982 A | 12/1987 | Come et al. | |
| 4,818,060 A | 4/1989 | Arroyo | |
| 4,859,024 A * | 8/1989 | Rahman | 385/112 |
| 5,285,008 A * | 2/1994 | Sas-Jaworsky et al. | 174/47 |
| 5,358,664 A | 10/1994 | Brauer | |
| 5,621,842 A | 4/1997 | Keller | |
| 6,226,431 B1 | 5/2001 | Brown et al. | |
| 6,374,023 B1 | 4/2002 | Parris | |
| 6,748,146 B2 | 6/2004 | Parris | |
| 6,749,446 B2 | 6/2004 | Nechitailo | |
| 6,778,745 B2 | 8/2004 | Debban, Jr. et al. | |
| 6,970,629 B2 | 11/2005 | Lail et al. | |
| 7,006,740 B1 | 2/2006 | Parris | |
| 2003/0086665 A1* | 5/2003 | Nechitailo | 385/110 |
| 2004/0213529 A1* | 10/2004 | Dowd et al. | 385/109 |
| 2005/0213902 A1 | 9/2005 | Parsons | |
| 2009/0003779 A1 | 1/2009 | Parris | |
| 2009/0003781 A1 | 1/2009 | Parris et al. | |
| 2009/0003785 A1 | 1/2009 | Parris et al. | |

OTHER PUBLICATIONS

U.S. Appl. No. 60/946,754, filed Jun. 28, 2007.
Commonly owned U.S. Appl. No. 60/946,744, filed Jun. 28, 2007.
Commonly owned U.S. Appl. No. 60/946,752, filed Jun. 28, 2007.
Commonly owned U.S. Appl. No. 12/146,526, filed Jun. 26, 2008.
Commonly owned U.S. Appl. No. 12/146,588, filed Jun. 26, 2008.
Kraton, Typical Properties Guide, copyright 2006, downloaded from the web on Mar. 26, 2007.

* cited by examiner

*Primary Examiner*—Daniel Petkovsek
(74) *Attorney, Agent, or Firm*—Summa, Additon & Ashe, P.A.

(57) ABSTRACT

Disclosed is an optical fiber cable that includes optical fibers and a deformable coupling element enclosed within a buffer tube. The coupling element is formed from a deformable yet substantially incompressible material and features a number of raised members projecting toward the optical fibers. The design of the coupling element layer permits coupling of the optical fibers to the buffer tube without the use of a compressive cushioning layer. This arrangement distributes the compressive force applied to discrete points along the outer perimeter of the optical fiber element.

18 Claims, 6 Drawing Sheets

OPTICAL FIBER CABLE HAVING RAISED COUPLING SUPPORTS

CROSS-REFERENCE TO PRIORITY APPLICATION

This application hereby claims the benefit of U.S. Provisional Patent Application Ser. No. 60/946,752, for Optical Fiber Cable Having Raised Coupling Supports (filed Jun. 28, 2007) via 35 U.S.C. § 119. U.S. Provisional Patent Application Ser. No. 60/946,752 is hereby incorporated by reference in its entirety.

FIELD OF THE INVENTION

The invention relates to an optical fiber cable that contains optical fibers inside a buffer tube.

BACKGROUND

Optical fiber cables are used to transmit information including telephone signals, television signals, data signals, and Internet communication. To preserve the integrity of the signal transported by optical fiber cables, certain design factors warrant consideration.

First, forces may develop on the optical fibers due to contact with rough, hard, or uneven surfaces within the optical fiber cables. Such contact, for example, may result from thermal cable expansion or contraction, which can cause microbending and macrobending effects. This, in turn, can lead to signal attenuation or signal loss. Layers of protective coatings and claddings around the optical fibers can help to reduce the forces that cause these unwanted effects.

Second, the optical fibers are typically coupled to the surrounding buffer tube in some way. This coupling prevents the optical fibers from pulling back inside the buffer tube as a result of processing, installation, handling, or thermally induced dimensional changes. Not only can these effects hamper accessibility to the fibers during connection operations (e.g., splicing), but also insufficient coupling can lead to excess and/or unevenly distributed optical fiber length (e.g., optical fibers accumulating in a confined space). Such accumulation may cause bending or otherwise force contact between the optical fibers and other cable elements, which can likewise lead to microbending and macrobending.

Third, optical fiber cables are typically used with electronic devices. If water intruding into the cables can spread (e.g., flow) along the length of the cables to these electronic devices, severe damage to the electronic systems may result. It is also thought that the formation of ice within an optical fiber cable can impose onto the optical fibers localized microbending-inducing forces or macrobending-inducing forces. Fillers and water-blocking layers within the cables can impede the movement of water within the cables and thereby limit such damage.

The undesirable effects of signal loss, coupling failure, and water damage can be reduced through the use of protective layers and coupling elements. The addition of these layers, however, can lead to larger cables, which are not only more costly to produce and store but also heavier, stiffer, and thus more difficult to install.

Manufacturers have typically addressed these problems by employing water-blocking, thixotropic compositions (e.g., grease or grease-like gels). For example, filling the free space inside a buffer tube with water-blocking, petroleum-based filling grease helps to block the ingress of water. Further, the thixotropic filling grease mechanically (i.e., viscously) couples the optical fibers to the buffer tube.

That usefulness notwithstanding, such thixotropic filling greases are relatively heavy and messy, thereby hindering connection and splicing operations. Consequently, filling greases carry certain disadvantages.

Various designs for dry cables have been developed to eliminate filling greases while providing water-blocking and coupling functions. For example, in a totally dry cable, filling grease may be replaced by a water-swellable element (e.g., tape or yarn carrying a water-swellable material).

Unfortunately, in practice, the water-swellable elements used in these designs may not provide for sufficient coupling of the optical fibers to the buffer tube. That is, the optical fibers are free to pull back inside the cable when the cable is installed or exposed to temperature extremes.

Purported solutions to this problem have been proposed, typically involving the inclusion of a cushioning material, such as polymeric foam (e.g., polyurethane foam), that either surrounds the optical fibers or is layered on the water-swellable tape. To achieve the desired mechanical coupling, though, the cushioning is sized such that it is compressed between the optical fibers and the buffer tube. In this way, the cushioning promotes frictional coupling of the optical fibers to the buffer tube.

Although frictional coupling is effective in preventing relative movement between the optical fibers and the buffer tube, the optical fibers may experience microbending or macrobending when the buffer tube contracts due to cooling. This may result in optical signal attenuation or signal loss. Further, the coupling pressure exerted on the optical fibers by the foam cushioning may diminish over time due to the relaxation or degradation of the polymeric foam.

Accordingly, there is a need for a dry optical fiber cable in which optical fibers are coupled to a buffer tube in a way that does not exert undue stresses on the optical fibers and is reliable over the life span of the cable.

SUMMARY OF THE INVENTION

In one aspect, the invention embraces a cable structure that provides coupling between buffer tubes and optical fiber elements. In this aspect, the present invention includes a coupling element that is bonded to one of the material layers in the cable, such as the inner wall of a buffer tube or a water-swellable tape layer.

This coupling element is made of a sufficiently elastic material so as to deform under the load of the optical fiber element (e.g., having elongation to break of at least about 100 percent at standard temperature and pressure) and has sufficient strength so as not to tear under the weight of the optical fiber element (e.g., having tensile strength of at least about 100 psi at standard temperature and pressure). It is typically dry.

The coupling element according to the present invention includes raised members positioned (e.g., formed) on one of the material surfaces within the buffer tube (e.g., the inner wall of the buffer tube, a water-swellable element, or a separate coupling insert). These raised members extend inward toward the optical fiber element. The raised members have a sufficient modulus and size to couple the optical fiber element to the buffer tube. The raised members of the coupling element, however, should not exert such a compressive force on the optical fiber element to cause significant optical attenuation as the optical fiber cable is temperature cycled or mechanically loaded during installation or use.

The coupling element may be, for instance, a tape with an extruded profile having a number of longitudinal ribs projecting from the surface of the tape and extending along the length of the tape. When this tape is formed into a tube, the ribs are oriented toward the center of the tube. If an optical fiber element is simultaneously fed into the tube, the ribs will support the optical fiber element near the center of the tube.

The design of the coupling element layer thus serves to couple the optical fiber element to the buffer tube at discrete contact points, thereby limiting the amount of compressive contact on the optical fiber elements. Compression, of course, can lead to optical signal losses. In this way, the design of the coupling element according to the present invention limits the occurrence of the kinds of unwanted pressures that can cause microbending or macrobending in the optical fiber element.

In brief, the design of the coupling element couples the optical fiber element to the buffer tube without employing a compressive, frictional cushioning layer. Further, in some instances the buffer tube structure according to the present invention can reduce cable costs by eliminating the use of conventional cushioning layers; only the raised members of this coupling element are used to support the optical fiber element rather than the entire surface of a cushioning layer. Additionally, the invention may incorporate water-blocking materials (e.g., super-absorbent polymers) to eliminate the need for a separate water-blocking layer.

The foregoing, as well as other characteristics and advantages of the invention and the manner in which the same are accomplished, is further specified within the following detailed description and its accompanying drawings.

DETAILED DESCRIPTION

The present invention is described herein with reference to the accompanying drawings. As will be appreciated by those having ordinary skill in the art, these drawings are schematic representations, which are not necessarily drawn to scale. This invention may be embodied in many different forms and should not be construed as limited to the embodiments set forth herein. The embodiments disclosed are provided to convey the scope of the invention to those having skill in the relevant art.

In one aspect, the invention embraces an optical fiber cable that provides satisfactory coupling of optical fibers and a surrounding buffer tube but in a way that reduces unwanted microbending and macrobending effects. In another aspect, the invention embraces methods of making such optical fiber cables.

Figure 1:
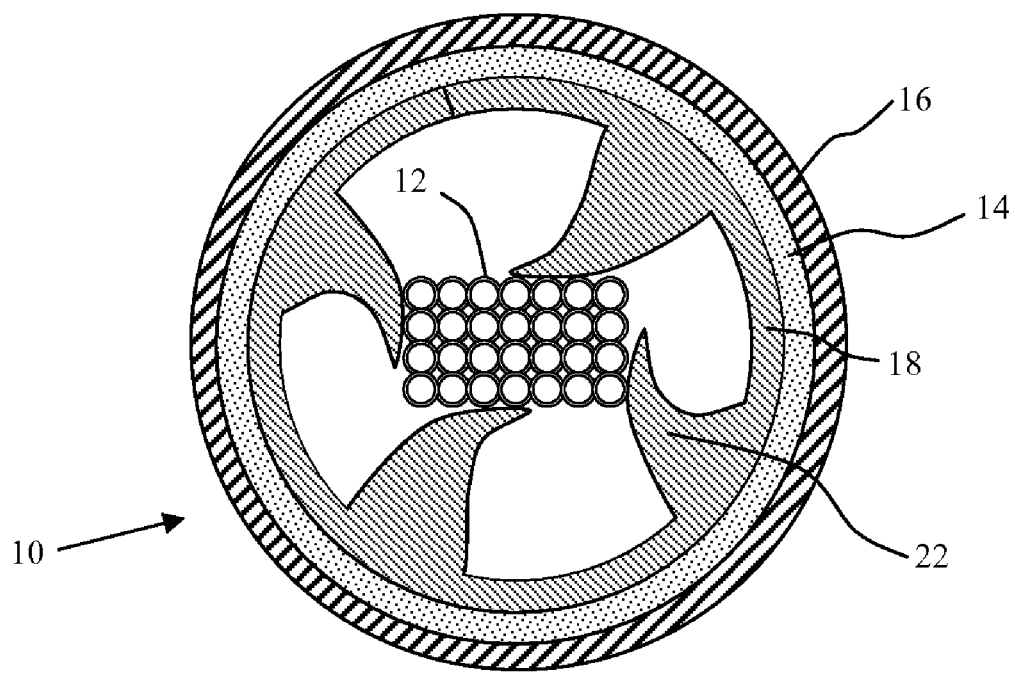
FIGS. 1, 2, 3, and 4 depict cross-sectional views of an optical fiber cable containing an optical fiber element according to exemplary embodiments of the present invention.

FIG. 1 depicts a cross-sectional view of one embodiment of an optical fiber cable 10 according to the present invention. In this exemplary embodiment, an optical fiber element 12 is disposed within a buffer tube 16. The optical fiber element 12 itself includes at least one optical fiber, typically a plurality of optical fibers (e.g., a ribbon stack). The optical fiber element 12 is typically manufactured with rotational twist.

In this exemplary embodiment, a water-swellable element 14 (e.g., a water-blocking material) is positioned adjacent to the inner wall of the buffer tube 16 between the optical fiber element 12 and the inner wall of the buffer tube 16. The water-swellable element 14 helps to block the ingress of water into the core of the optical fiber cable 10 or, if water intrusion occurs, helps to prevent the movement of water along the length of the optical fiber cable 10. The water-swellable element 14 may be secured to the buffer tube 16, for example, by an adhesive, by melt-bonding part of the water-swellable element 14 to the buffer tube 16 during extrusion, or by frictional coupling of the water-swellable element 14 and the buffer tube 16.

Figure 2:
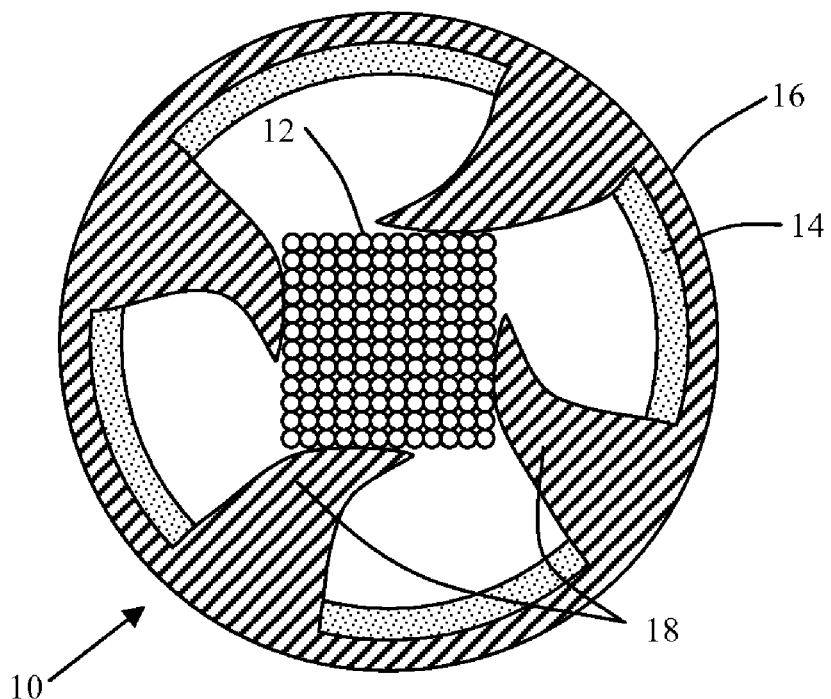

Further referencing the exemplary embodiment of FIG. 1, a coupling element 18 is positioned adjacent to the optical fiber element 12 (i.e., between the optical fiber element 12 and the buffer tube 16). An exemplary coupling element 18 is a coupling tape, though the coupling element 18 can be formed in-situ, such as via melt extrusion. As depicted in FIG. 1, the coupling element 18 includes raised members 22 (e.g., ridges, bumps, nubs, ribs, or spikes) that couple the optical fiber element 12 to the buffer tube 16. The raised members 22 of the coupling element 18 are configured (e.g., sized) to provide sufficiently forced contact with the optical fiber element 12 to secure the optical fiber element 12 within the buffer tube 16. FIG. 1 (and FIGS. 2, 3, and 4, too) show the deformation of the raised members 22 upon interference contact with the optical fiber element 12. Those having ordinary skill in the art will understand that the coupling element 18 is intended to embrace raised members 22 that are formed on one or more inserts or that are discrete from one another (e.g., metered or otherwise extruded onto the inner wall of the buffer tube 16). See FIGS. 1 and 3.

The use of a coupling element 18 having raised members 22 may better distribute the force needed to couple the optical fiber element 12 to the buffer tube 16. For example, a layer of compressible material having a uniform thickness and surrounding a ribbon stack (e.g., uniform cushioning layer) may squeeze the ribbon stack at its corners. As a result, the corner fibers (i.e., located at the corner positions) experience the force applied by the coupling material along the entire length of the cable. Having this coupling force consistently focused on the same individual optical fibers is thought to increase the likelihood of attenuation-causing macrobending or microbending.

In contrast, raised members 22 distributed about the ribbon stack will contact the ribbon stack wherever the raised members 22 are present independent of the geometry of the ribbon stack. If the ribbon stack is twisted (as is typical in the industry), the coupling element 18 having this configuration contacts different optical fibers around the perimeter of the ribbon stack at different cross-sections of the optical fiber cable 10. Stated otherwise, the coupling element 18 may apply a force to an optical fiber positioned on the perimeter of the ribbon stack at some points along the length of the optical fiber cable 10, but it will not apply that force continually at every point along the length. This configuration thus helps to distribute the force applied by the raised members 22 to the optical fiber element 12 (and vice-versa) over the perimeter of the optical fiber element 12 instead of concentrating the compressive force on the corners of the ribbon stack (i.e., the corner fibers).

Additionally, a deformable coupling element 18 having raised members 22 can better accommodate optical fiber elements 12 of different dimensions. The thickness of conventional coupling foam must be specifically sized for the dimensions of the ribbon stack that is to be positioned within the buffer tube 16. Otherwise, the coupling foam either may exert excessive force on the ribbon stack, which can cause microbending or macrobending, or it may not exert enough compressive force to provide frictional coupling.

In contrast, the raised members 22 of the present invention conform to the dimensions of the optical fiber element 12 carried within the optical fiber cable 10. In this way, the same kind of coupling element 18 (i.e., identical design and size) may be secured within different buffer tubes 16 to couple differently sized optical fiber elements 12.

Those having ordinary skill in the art will appreciate that optical fiber cable embodiments like those depicted in FIGS. 1-4, for instance, can each be employed with optical fiber ribbon stacks that are fully or partially embedded within a coupling material. By way of example, the coupling material directly surrounding the optical fiber ribbon stacks could be softer (or firmer) than the coupling material that forms the raised member(s) 22 of the coupling element 18.

FIGS. 5, 6, 7, and 8 depict variations of the coupling element 18 according to the present invention. In each depicted embodiment, the coupling element 18 incorporates several raised members 22 projecting from a substrate. Those having skill in the art will appreciate that the raised members 22 may be formed in a wide variety of shapes to couple the optical fiber element 12 to the buffer tube 16 (e.g., triangular, rectangular, semi-circular, trapezoidal, or pentagonal profile). See e.g., FIG. 7.

Figure 8:
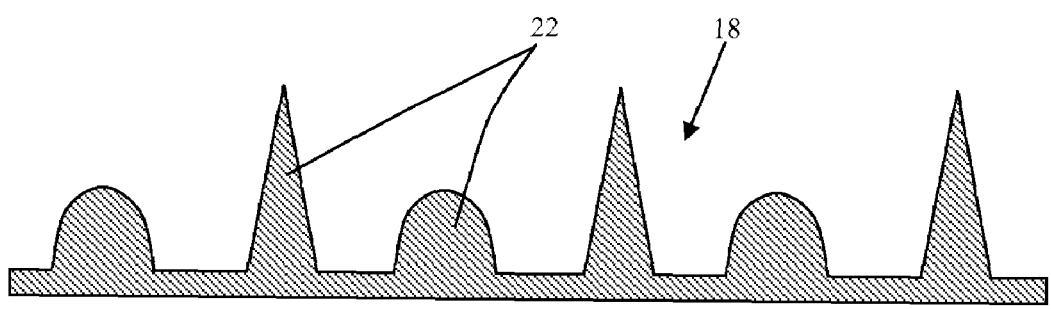

Further, raised members 22 having different shapes incorporated into a single coupling element 18 provide certain functional advantages. As depicted in FIG. 8, the coupling element 18 includes alternating large (i.e., primary) and small (i.e., secondary) raised members 22 to provide varying degrees of coupling. In this illustrative embodiment, the primary raised members 22 provide the near-minimum contact needed to support the optical fiber element 12 within the buffer tube 16, but in circumstances in which greater coupling force is required (e.g., large-scale bending or excess length development), the secondary raised members 22 provide additional coupling support.

For example, if the optical fiber cable 10 is substantially bent, the primary raised members 22 might deform so much that one or more secondary raised members 22 come into interference contact with and thereby support the optical fiber element 12. The number, shape, and configuration of the raised members 22 should be designed to account for such considerations, but, at a minimum, the raised members 22 must effectively couple the optical fiber element 12 to the buffer tube 16. These design parameters, of course, will be specific to the needs of the optical fiber cable 10 but are within the abilities of those having ordinary skill in the art.

It should be noted that, regardless of the size or shape of the raised members 22 of the coupling element 18, raised members 22 according to the present invention will typically taper from a relatively wider base nearest to the inner wall of the buffer tube 16 to a relatively narrower end at or near the center of the buffer tube 16 (e.g., typically in contact with the optical fiber element 12). This structure may be observed in raised members 22 that taper uniformly to a point (see, e.g., FIG. 5) or raised members 22 that have a more rounded profile (see, e.g., FIG. 6). In other embodiments, the raised members 22 possess a wide end or overall bulbous profile and taper to a relatively narrow base nearest to the inner wall of the buffer tube 16 (see, e.g., FIG. 7).

In any form, a generally tapering configuration ensures that the force applied to couple the optical fiber element 12 to the buffer tube 16 is appropriate for the size of the optical fiber element 12. In this way, it is easier to deform the narrow ends of the raised members 22 than the thick base, and thus the narrow ends will exert less force. If an optical fiber element 12 is large enough to displace more than just the ends, though, the force needed to deform the raised members 22 (and thus the force exerted by the raised members 22) is greater.

For instance, a small optical fiber element 12 (e.g., a single optical fiber) requires relatively little force to secure it within an optical fiber cable 10, so the relatively small force resulting from the deformation of the narrow tips of the raised members 22 is sufficient to provide the necessary coupling. In contrast, a larger optical fiber element 12 (e.g., a 12×12 ribbon stack) may require more force to secure it within the optical fiber cable 10, and the force initiated by the deformation of wider portions of the raised members 22 is needed to provide the necessary coupling.

It is desirable for whatever material is used to be at least somewhat pliable to distribute the compressive force applied to the optical fiber element 12 over the surface of optical fiber element 12. Additionally, some degree of deformation (e.g., lateral deformation) ensures the coupling element 18 can accommodate within the buffer tube 16 optical fiber elements 12 of various sizes. As will be understood by those having ordinary skill in the art, the raised members 22 will deform more to couple with a large optical fiber element 12 than they will to secure a small optical fiber element 12.

The coupling element 18 according to the present invention may thus be made from material that will yield under the load of the optical fiber element 12 but that has sufficient strength to effectively couple the optical fiber element 12 to the optical fiber cable 10 and not tear under such a load. For example, the raised members 22 may be formed of a foamed material having a sufficiently rigid structure to hold the optical fiber element 12 in place. Alternatively, the raised members 22 may be made of a coupling material that, as discussed hereinafter, is substantially incompressible but that will readily deform under light loading.

For instance, an exemplary incompressible coupling material possesses excellent elasticity; at standard temperature and pressure, it has an elongation to break of at least about 100 percent, typically at least about 250 percent, and more typically at least about 500 percent. In some instances, the coupling composition may possess an elongation to break of at least about 1,000 percent or more (e.g., about 1,500 percent). Furthermore, this deformable but substantially incompressible material is tear resistant and durable; at standard temperature and pressure, it has tensile strength of at least about 100 psi and typically at least about 400 psi. In some instances, the coupling material may possess a tensile strength of about 1,000 psi or more.

As used herein, standard temperature and pressure refers to testing conditions of 50 percent relative humidity at 70° F. (i.e., about 20° C.) and atmospheric pressure (i.e., 760 torr).

In this exemplary embodiment, therefore, the coupling element 18 itself is generally structured to deform rather than to compress when subjected to applied force. Those having ordinary skill in the art will appreciate that, as a general matter, solids are incompressible. Many seemingly solid structures (i.e., colloidal foams) will compress under pressure. This apparent compression, however, is thought to be the result of either compression (e.g., closed-cell foams) or ejection (e.g., open-cell foams) of entrained gas bubbles rather than compression of the solid material itself.

This exemplary embodiment of coupling element 18 embraces materials that, though not compressible, will deform upon interference contact with another material object. Such deformable yet substantially incompressible materials are typically solids, but embrace non-solids, too, such as viscous liquids and cohesive gels (e.g., an oil-expanded polymeric material).

As used herein, "interference contact" is meant to describe physical contact between two objects in which one of the objects is compressed, deformed, or otherwise displaced by the other (i.e., more than mere touching).

Exemplary materials for the coupling element 18 include low-porosity solid gels, soft rubbers, soft cross-linkable silicones, and various polymers (e.g., styrene-butadiene, styrene-isoprene-styrene, styrene-ethylene/butylene-styrene, and styrene-ethylene/propylene-styrene) plasticized with mineral oils or, more typically, synthetic oils.

In this regard, plasticizers, which have an affinity for polymers, can be included in amounts between 10 and 95 weight percent. As forth herein, the present invention typically employs plasticizers at the upper end of this range (e.g., more than 50 weight percent oil).

In addition, the materials employed for the coupling element 18 can further include lubricants, which have an aversion to the polymers and plasticizers, in amounts up to about five weight percent. As will be known to those having ordinary skill in the art, surface migration of lubricants reduces friction between the coupling material and processing equipment, thereby facilitating polymer processing (e.g., extrusion). In general, the coupling materials for use in the present optical fiber cable 10 may include a lubricant or similar processing aid.

It has been discovered that blending super-high molecular weight polymeric materials and oils that are capable of flowing at low temperatures (i.e., possessing a low pour point) can yield soft, cohesive gels (i.e., coupling materials) that provide exceptional performance. The cohesive gels formed from these polymer/oil blends usually possess a melt flow temperature of at least about 80° C. (e.g., 90° C. or more). Typical polymer/oil blend ratios are between 30:70 and 5:95, more typically less than 15:85 (e.g., 8-12 weight percent polymer), and in some instance less than 10:90 (e.g., 5-9 weight percent polymer). The tensile strength of the cohesive gels (e.g., plasticized high-molecular weight elastomeric polymers) tends to be proportional to the weight fraction of the super-high molecular weight polymers. Elasticity (e.g., elongation to break) is roughly comparable across these aforementioned blend ranges (i.e., between about five and 30 weight percent super-high molecular weight polymer).

As used herein and unless otherwise specified, molecular weight refers to number-average molecular weight, rather than weight-average molecular weight.

Excellent elastomeric block copolymers for use in the present polymeric/oil blends include styrene-ethylene/butylene-styrene copolymers (i.e., with an S-EB-S block structure) having a number-average molecular weight of about 100,000 g/mol or more, and typically about 200,000 g/mol or more (as measured by gel permeation chromatography) (e.g., 200,000 to 2,000,000 g/mol). The SEBS copolymers possess excellent weatherability and, at super-high molecular weights, demonstrate elevated elongation to break. An exemplary, super-high molecular weight styrene-ethylene/butylene-styrene block copolymer is commercially available under the trade name KRATON G-1651.

As will be appreciated by those having ordinary skill in the art, super-high molecular weight elastomeric block copolymers, particularly styrene-ethylene/butylene-styrene copolymers, have not been successfully employed commercially in communication cables. Plasticizing even modest weight fractions (e.g., 3 weight percent or more) of super-high molecular weight styrene-ethylene/butylene-styrene block copolymers is exceedingly difficult, requiring unconventionally high processing temperatures (e.g., 250-350° F.). In addition, the relative high fractions of oil (e.g., more than about 70 weight percent) depress melt strength, thereby making extrusion blending and pelletizing impractical.

Further, with respect to the foregoing polymeric/oil blends, outstanding oils do not crystallize or form wax precipitates at low temperatures. Such oils typically possess a pour point of −25° C. or less (e.g., −30 to −35° C.). Moreover, satisfactory oils used in the coupling material should plasticize the elastomeric block copolymers but not adversely affect the polymeric materials that are conventionally employed for buffer tube casings, particularly polyolefins.

Accordingly, the most acceptable oils possess low absorbability in polyethylene or polypropylene, either of which is a cost-effective polymeric material suitable for buffer tube casings. If absorbability is relatively high, conventional polyolefin buffer tubes (e.g., polyethylene or polypropylene casings) will tend to absorb excessive quantities of oil. As will be appreciated by those having ordinary skill in the art, excessive oil absorption will cause polyolefin buffer tubes to swell and, more importantly, to soften, thereby causing a loss in crush resistance.

Synthetic hydrocarbon oils, such as highly branched iso-parrafinic polyalphaolefins (PAOs), perform well in this regard. Exemplary synthetic hydrocarbon oils possess a pour-point of −25° C. or less (e.g., −30° C. to −50° C.) and some −40° C. or less (e.g., −45° C. to −65° C.).

In addition, exemplary synthetic hydrocarbon oils possess an absorbability in polyethylene and/or polypropylene of less than 20 percent, typically less than 15 percent (e.g., 8-12 percent), more typically less than 10 percent (e.g., 4-8 percent), and most typically less than 5 percent (e.g., 2-3 percent). As used herein, the concept of absorbability describes an oil's ability at 85° C. to saturate a particular polymer and is measured by that polymer's weight percent increase as a result of oil absorption to saturation. For instance, an oil having 7 percent absorbability in polypropylene means that a 100 gram sample of polypropylene absorbs 7 grams of oil at about 85° C.

The synthetic hydrocarbon oils (e.g., PAOs) typically possess a viscosity of 2-40 centistokes at 100° C., more typically 5-9 centistokes at 100° C. (e.g., 6-8 centistokes at 100° C.). An exemplary synthetic oil is available from Chevron Phillips under the trade name SYNFLUID PAO.

In accordance with the foregoing, one exemplary cohesive gel for use as a coupling material is formed from a blend of super-high molecular weight styrene-ethylene/butylene-styrene (SEBS) copolymers (e.g., possessing a number-average molecular weight of about 200,000 g/mol or higher) and synthetic hydrocarbon oils, particularly polyalphaolefins (PAOs), having a pour-point of less than about −25° C. (e.g., −35° C. or less) and an absorbability in polyethylene and/or polypropylene of less than about 10 percent (e.g., 1-4 percent). For instance, a PAO oil having a viscosity of about six centistokes at 100° C. possesses a pour point of −63° C.

Another cohesive gel is formed from a blend of the high molecular weight styrene-ethylene/butylene-styrene (SEBS) copolymers and synthetic hydrocarbon oils having (i) a pour-point of less than about −15° C. and an absorbability in polyethylene and/or polypropylene of less than about 5 percent (e.g., 2-3 percent) and/or (ii) a pour-point of less than −35° C. and an absorbability in polyethylene and/or polypropylene of less than about 15 percent (e.g., 2-3 percent).

In accordance with the foregoing, these exemplary embodiments of the polymer/oil cohesive gel can be formed by blending (i) between about 5 and 15 weight percent (e.g., 7-13 weight percent) of the super-high molecular weight styrene-ethylene/butylene-styrene block copolymers, such as those available under the trade name KRATON G-1651 and (ii) at least about 85 weight percent of a polyalphaolefinic synthetic oil having a viscosity of 5-8 centistokes at 100° C., such as that available under the trade name SYNFLUID PAO.

One or more of the foregoing coupling materials are disclosed in U.S. Provisional Patent Application Ser. No. 60/946,754, for Coupling Composition for Optical Fiber Cables (filed Jun. 28, 2007) and U.S. patent application Ser. No. 12/146,588, for Coupling Composition for Optical Fiber Cables (filed Jun. 26, 2008), each of which is hereby incorporated by reference in its entirety.

In accordance with the foregoing, in one particular embodiment, an optical fiber cable 10 contains an optical fiber element 12 with at least one optical fiber (e.g., a single optical fiber, a helical winding of at least two optical fibers, or a ribbon stack). A buffer tube 16 encloses the optical fiber element 12. A substantially incompressible coupling element 18 is disposed between the optical fiber element 12 and the buffer tube 16. Raised members 22 on the coupling element 18 project inward from the coupling element 18 to the optical fiber element 12.

Figure 3:
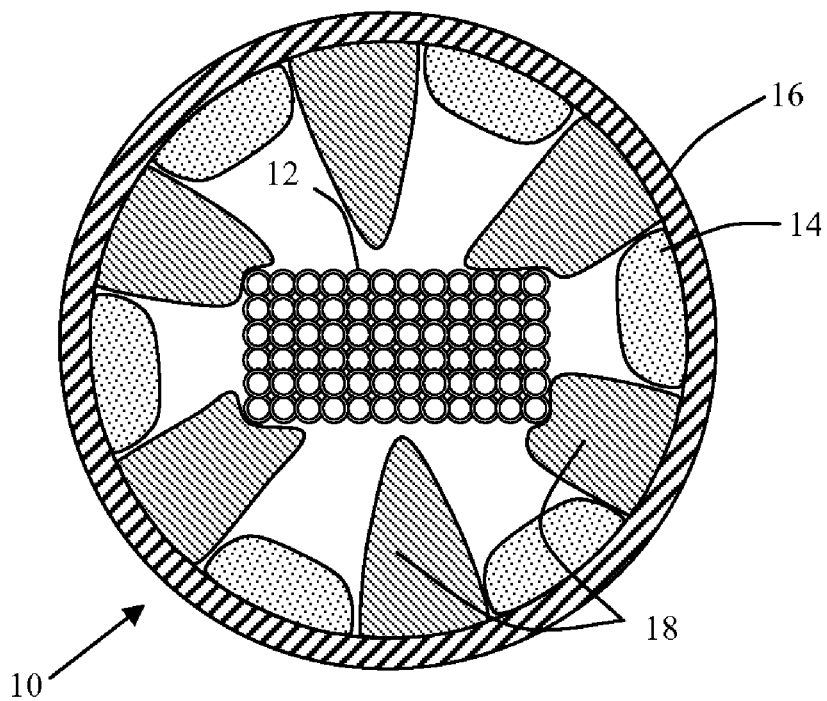
Figure 4:
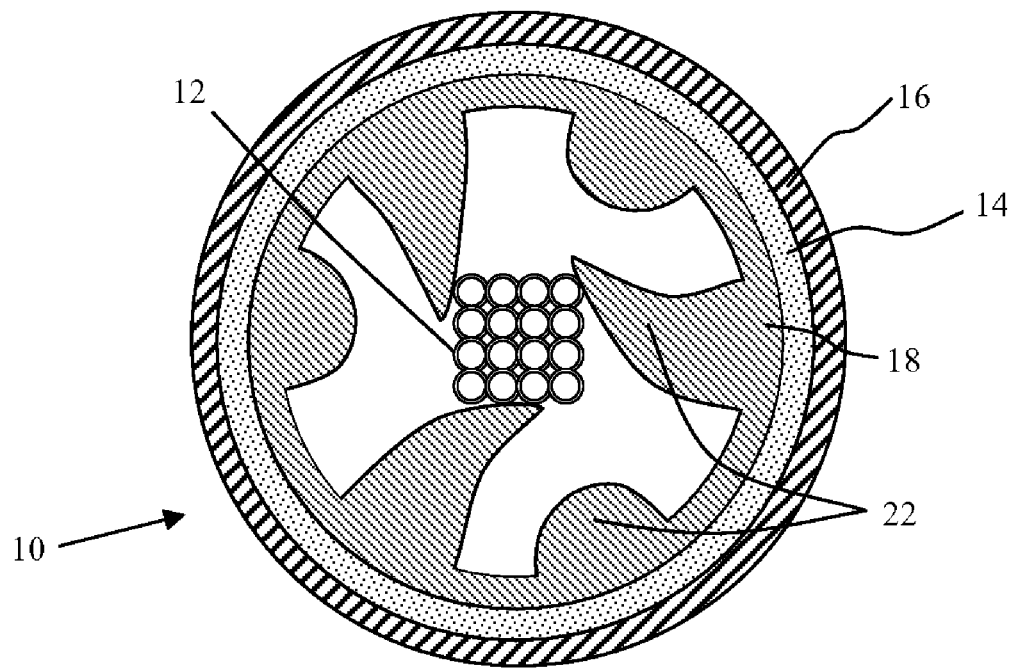
Figure 5:
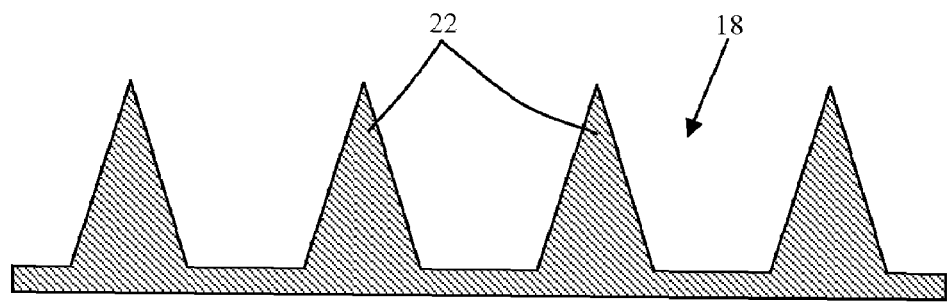
FIGS. 5, 6, 7, and 8 depict cross-sectional views of coupling element profiles according to exemplary embodiments of the present invention.
Figure 6:
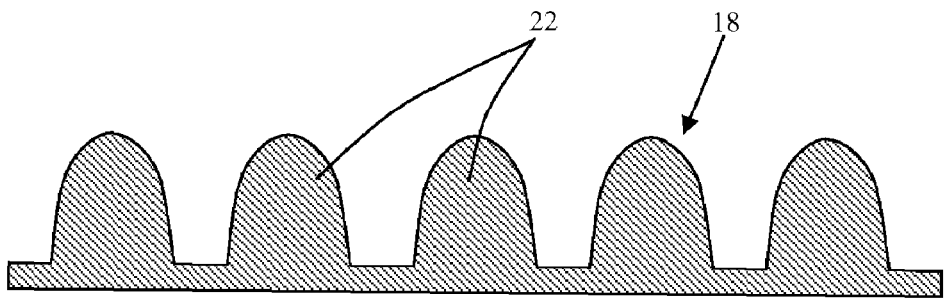
Figure 7:
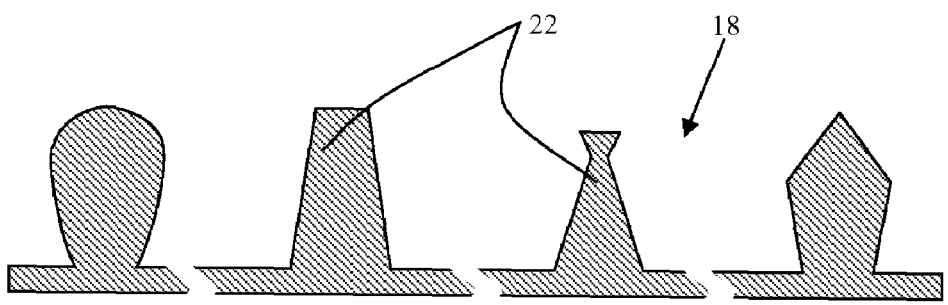

At a cable cross-section that includes this coupling element 18, one or more of the raised members 22 are in sufficiently forced contact with said optical fiber element 12 to become displaced. The raised members 22 may be laterally displaced, as shown in FIG. 1, or they may be otherwise deformed, as shown in FIG. 3. Regardless of the manner in which the coupling element 18 deforms, raised members 22 formed of sufficiently elastic materials, such as those described herein, will accommodate the optical fiber element 12 within the buffer tube 16 but will exert a force on the optical fiber element 12 due to the tendency of the elastic material to revert to its natural shape. As noted above, FIGS. 1, 2, 3, and 4 show the deformation of the raised members 22 upon interference contact with the optical fiber element 12.

Accordingly, the interference contact of the two elements restrains the optical fiber element 12 within the buffer tube 16, thereby achieving the desired coupling. The raised members 22 of the coupling element 18, however, should not exert such a compressive force to cause significant optical attenuation of the optical fiber element 12.

To ensure a greater degree of coupling between the optical fiber element 12 and the buffer tube 16, the coupling element 18 may be configured so that, at any cable cross-section that includes this coupling element 18 (i.e., everywhere along the length of cable), the raised members 22 are in sufficiently forced contact with the optical fiber element 12 to become displaced.

In another embodiment, the invention embraces an optical fiber cable 10 containing an optical fiber element 12 enclosed with a buffer tube 16. The optical fiber element 12 includes at least one optical fiber (e.g., a single optical fiber, at least two optical fibers twisted together, or a ribbon stack). A coupling element 18 made up of a deformable yet substantially incompressible material is positioned between the optical fiber element 12 and the buffer tube 16. Typically, the coupling element 18 itself is substantially incompressible.

Raised members 22 formed of the coupling element 18 serve to couple the optical fiber element 12 to the buffer tube 16. To provide the desired coupling of the optical fiber element 12 to the buffer tube 16, the raised members 22 possess an elongation to break of at least about 100 percent at standard temperature and pressure, or upwards of 1,000 percent or more. The raised members 22 should also possess a tensile strength of at least about 100 psi at standard temperature and pressure, up to about 500 psi or more.

Figure 9:
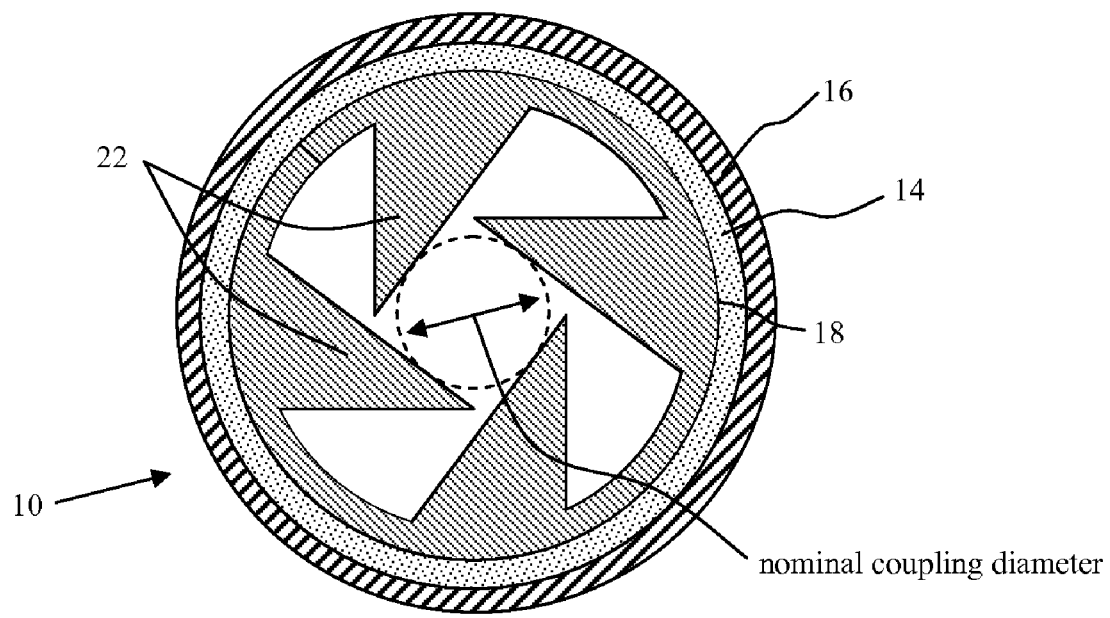
FIGS. 9, 10, 11, and 12 depict cross-sectional views of an optical fiber cable according to exemplary embodiments of the present invention (each shown without an optical fiber element to better illustrate the sizing of the coupling element in exemplary coupling element configurations).

The raised members 22 may project radially inward to contact the optical fiber element 12, or the raised members 22 may project into the buffer tube 16 obliquely (i.e., not directed to the central axis of the buffer tube 16, such as is depicted in FIG. 9) to provide the desired coupling of the buffer tube 16 to the optical fiber element 12. In either configuration, one or more of the raised members 22 are in sufficiently forced contact with the optical fiber element 12 to become deformed, typically laterally displaced.

The coupling element 18 should be configured and sized to require that the raised members 22 of the coupling element 18 contact the optical fiber element 12—at least for some discrete segments along the optical fiber cable 10. In such a configuration, raised members 22 formed of sufficiently elastic materials, such as those described herein, will yield to the optical fiber element 12 but will apply a force resisting the displacement caused by this interference contact because of the tendency of an elastic material to return to its original shape.

Specifically, at any given cable cross-section that includes the coupling element 18, unless the raised members 22 of the coupling element 18 are sized to physically meet at or near the center of the buffer tube 16, the raised members 22 provide a central free area. At such a cable cross-section, this central free area is the area within the buffer tube 16 in which no raised member 22 can create contact with an optical fiber element 12 positioned within the buffer tube 16. There may be additional free area between adjacent raised members 22, of course, but because optical fiber cable arrangements typically orient the optical fiber element 12 near the center of the optical fiber cable 10, usually only the central free space need be considered when sizing the coupling element 18.

In this regard, the concept of "nominal coupling diameter" is used herein to characterize this non-contact area within the inner region of the optical fiber cable 10 (e.g., within the coupling element 18 and the buffer tube 16).

Figure 10:
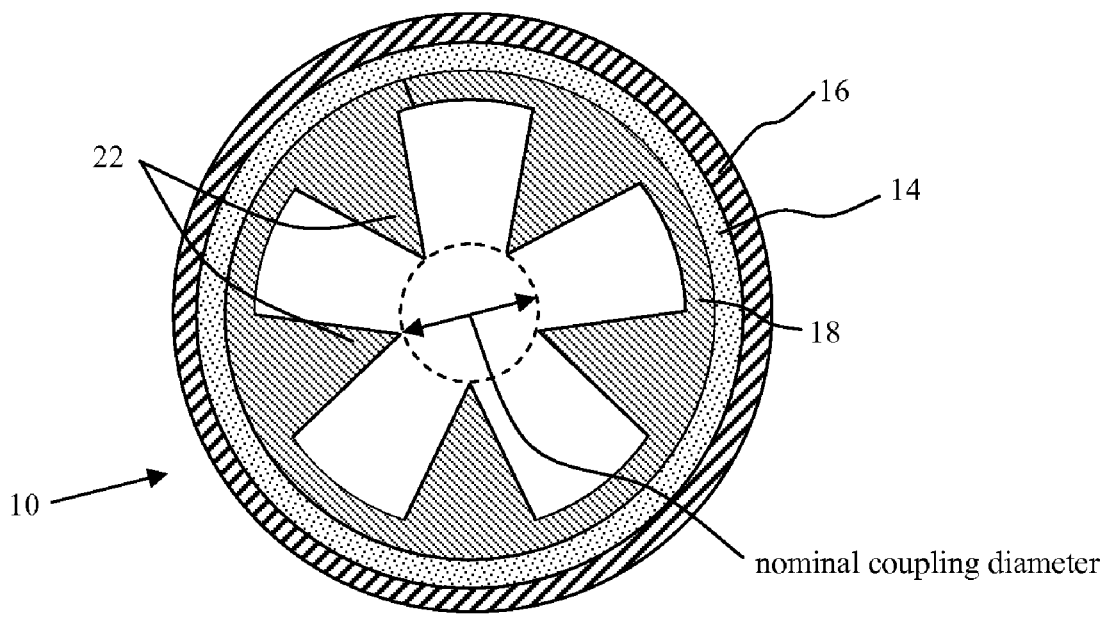

In particular, as used herein, the term "nominal coupling diameter" describes, at any given cable cross-section that includes the coupling element 18, the diameter of the largest circular cross-section (i.e., circle) that fits within the inner area (i.e., the central free area) defined by the coupling element 18 (and the buffer tube 16 or other surrounding cable components) without touching the coupling element 18. See FIGS. 9 and 10. Furthermore and as used herein, a cable cross-section that does not include (i.e., intersect or otherwise traverse) the coupling element 18 does not define a nominal coupling diameter.

Likewise, the optical fiber element 12 defines a maximum width and a minimum width. As used herein, the term "maximum width" is meant to characterize the largest cross-sectional dimension of the optical fiber element 12. For example, for an optical fiber bundle having a circular cross-section, the maximum width is simply the diameter of the circle it defines. For a rectangular ribbon stack, the maximum width is the measurement of its diagonal. Similarly, the term "minimum width" is meant to characterize the smallest cross-sectional dimension of the optical fiber element 12. For a rectangular ribbon stack, the minimum width is the smallest of either the height or width of the ribbon stack.

In accordance with one embodiment of the optical fiber cable 10, at any cross-section of the optical fiber cable 10, the nominal coupling diameter of the coupling element 18 is sized so that it is less than the maximum cross-sectional width of the optical fiber element 12 (e.g., a twisted ribbon stack). In other words, along the length of the optical fiber cable 10, the coupling element 18 is sized such that the optical fiber element 12 can be secured within the buffer tube 16 (and adjacent to the coupling element 18) by the coupling element 18. This configuration can be effective, for example, for securing a twisted ribbon stack within an optical fiber cable 10. As the ribbon stack turns within the buffer tube 16, it will be coupled to the buffer tube 16 wherever its diagonal aligns with the raised members 22 of the coupling element 18.

Alternatively, those having ordinary skill in the art will appreciate that in a particular embodiment of the optical fiber cable 10, at any cross-section of the optical fiber cable 10, the nominal coupling diameter of the coupling element 18 may be sized such that it is approximately equal to the maximum cross-sectional width of the optical fiber element 12. In such configurations, the coupling element 18 is not required to be in interference contact with the optical fiber element 12. Even so, any radial movement of the optical fiber element 12 within the buffer tube 16 is resisted.

This configuration might be effective, for example, for smaller optical fiber elements 12, which require relatively little force to secure them within an optical fiber cable 10. For instance, for securing a small, twisted ribbon stack within an optical fiber cable 10, the ribbon stack, as it turns within the buffer tube 16, will be coupled to the buffer tube 16 wherever a corner of the ribbon stack becomes aligned with the raised members 22 of the coupling element 18.

For example, for an optical fiber bundle having an approximately circular cross-section, the maximum cross-sectional width (i.e., the diameter of the near-circle it defines), will be approximately equal to the nominal coupling diameter of the coupling element 18. For a rectangular ribbon stack, the maximum cross-sectional width (i.e., measured at its diagonal) will approximately equal the nominal coupling diameter of the coupling element 18 (i.e., the four corners defined by the ribbon stack will be in contact with the coupling element 18). Stated otherwise, the raised members 22 of the coupling element 18 will be in contact—albeit light contact—with the optical fiber element 12.

In yet another embodiment, in accordance with FIG. 9, coupling element 18 may be configured to completely surround a substantially rectangular or square optical fiber element 12 (i.e., the four sides of the ribbon stack will align and be in contact with the raised members 22 of the coupling element 18). Those having ordinary skill in the art will appreciate that the configuration of the coupling element 18 (e.g., illustrated in FIG. 9) may be modified to accommodate ribbon stacks of various sizes and shapes (e.g., where the uppermost and lowermost optical fiber ribbons have fewer optical fibers than those toward the center of the ribbon stack).

In accordance with another embodiment of the optical fiber cable 10, at one or more cross-sections of the optical fiber cable 10, the nominal coupling diameter of the coupling element 18 is sized so that it is less than the minimum cross-sectional width of the optical fiber element 12. In other words, along the length of the optical fiber cable 10 there is at least one cross-section in which the coupling element 18 is sized such that the optical fiber element 12 must contact the coupling element 18, regardless of how it is oriented within the buffer tube 16.

The coupling element 18 of these embodiments may be sized so that the nominal coupling diameter is significantly less than the minimum width of the optical fiber element 12 (i.e., sized to ensure the elements "overlap"). For instance, a significant difference between the nominal coupling diameter and the minimum width of the optical fiber element 12 (i.e., overlap) might be about ten percent or more. So-called overlaps of about five percent (or even about one percent or less) may be considered significant in some configurations if the amount of interference contact causes substantial deformation of the raised members 22 to secure the optical fiber element 12 within the buffer tube 16. The extent of the overlap between these dimensions (i.e., interference contact) determines the degree of displacement with respect to the raised members 22, which can influence the amount of force applied to restrain the optical fiber element 12. The coupling element 18 may thus be sized such that the nominal coupling diameter is sufficiently less than the minimum width of the optical fiber element 12 so as to require lateral displacement of one or more raised members 22.

Figure 11:
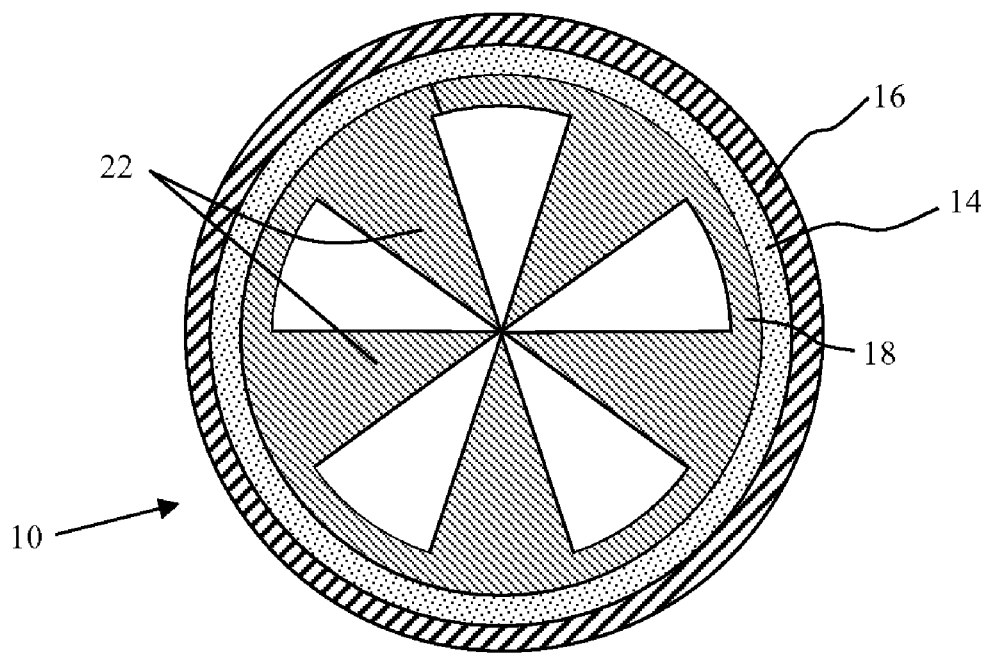
Figure 12:
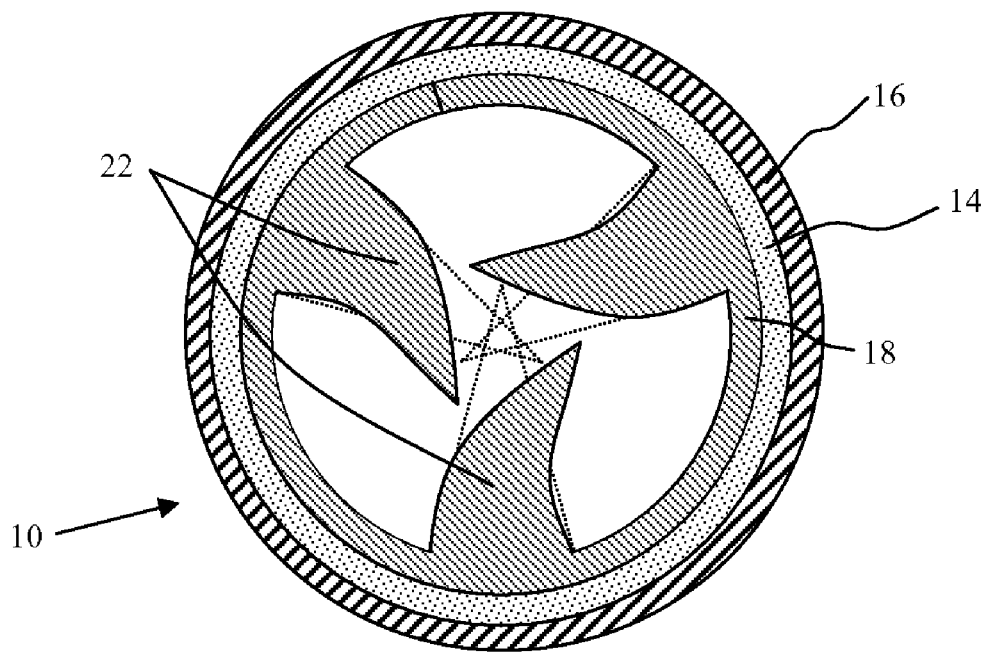

For example, coupling of the optical fiber element 12 within the buffer tube 16 can be effectively assured regardless of the size of the optical fiber element 12 by positioning and/or sizing the coupling element 18 so that the nominal coupling diameter is zero. In other words, the raised members 22 may meet at or near the center of the buffer tube 16, as is depicted in FIG. 11. Alternatively, the raised members 22 may be sized to extend through the center of the buffer tube 16, as is depicted in FIG. 12. In other words, the raised members 22 are sized to overlap each other such that they must deform substantially to accommodate an optical fiber element 12 of any dimension. These exemplary coupling element configurations may be used for supporting very small optical fiber elements 12 or in any instance when a greater degree of coupling is desired.

In yet another exemplary embodiment of the optical fiber cable 10, an optical fiber element 12 including one or more optical fibers (e.g., a single fiber, multiple fibers twisted together, or a twisted ribbon stack) is positioned within a buffer tube 16. A substantially incompressible coupling element 18 is positioned between the optical fiber element 12 and the buffer tube 16. The coupling element 18 includes raised members 22 projecting toward the optical fiber element 12. Specifically, at least one of the raised members 22 tapers inwardly to an end (e.g., to an apex) adjacent to the optical fiber element 12 from a base nearer to the buffer tube 16. Again, the raised members 22 may project radially inward or obliquely toward the optical fiber element 12 so long as they are in sufficiently forced contact with the optical fiber element 12 to become deformed (e.g., bent laterally).

In a variation on this embodiment, at a cable cross-section that includes the coupling element 18, multiple profiles for the raised members 22 are provided. For example, as shown in FIG. 8, relatively longer primary raised members 22 taper inwardly to an apex. Relatively shorter secondary raised members 22 provide support only in instances where the primary raised members 22 cannot sufficiently support the optical fiber element 12, such as during large-scale bending or during substantial thermal contraction of the buffer tube 16 (thereby causing excess length). Moreover, the relatively longer primary raised members 22 and the relatively shorter secondary raised members 22 may be formed from the same composition or different compositions. For instance, the relatively longer primary raised members 22 may possess a higher modulus than do the relatively shorter secondary raised members 22.

As used herein, the term "apex" refers to the end of the raised member 22 that engages or is capable of engaging the optical fiber element 12. See FIGS. 5 and 8. In general, the tip of the apex will typically contact the optical fiber element 12. Those having ordinary skill in the art will appreciate, however, that the lateral deformation of the raised members 22 might be sufficient to direct the tip of the apex away from the optical fiber element 12 (i.e., in a non-contact configuration, such as a J-shape).

Those having ordinary skill in the art will appreciate that the optical fiber cable 10 of the present invention can be viewed as including a central cable core positioned within a buffer tube 16. The core itself contains the optical fiber element 12, which is at least partly positioned within the coupling element 18. In accordance with the present invention, at one or more cross-sections of the optical fiber cable 10, the coupling element 18 defines a nominal coupling diameter that is sufficiently less than the minimum width of the optical fiber element 12 so as to cause the lateral displacement of one or more raised members 22.

The core may further include a water-swellable element 14, which is positioned adjacent to the coupling element 18, typically opposite the optical fiber element 12. The water-swellable element 14 helps to block the ingress of water into the core or, if water intrusion occurs, to impede the flow of water along the length of the optical fiber cable 10.

In any of these exemplary embodiments, the coupling element 18 can be formed or otherwise positioned within the buffer tube 16 in various ways. For instance, the coupling element 18 may be an extruded flat tape having a series of longitudinal ribs. These longitudinal ribs serve as the raised members 22, which project from the surface of the tape along its length. The tape can then be shaped into a tube surrounding the optical fiber element 12. This shaping, for instance, may be accomplished by securing the side edges of the coupling element 18 together to form a longitudinally-wrapped tube (i.e., a convolute structure). Alternatively, the tape may be wrapped helically about the optical fiber element 12 to form a tube (i.e., spirally-wound structure).

Alternatively, the coupling element 18 may be co-extruded with the buffer tube 16 to not only surround the optical fiber element 12 but also bond the coupling element 18 and the buffer tube 16 together. Similarly, the coupling element 18 may be incorporated into the buffer tube 16 by extruding a buffer tube 16 having raised members 22. In other words, raised members 22 are formed directly on the inner wall of the buffer tube 16. See FIG. 2. In this configuration, the raised members 22 may be composed the same material as the buffer tube 16, or they may be formed from a different material (e.g., a foam or a deformable yet substantially incompressible solid material).

In yet another variation, the coupling element 18 may be metered or otherwise extruded separately from the buffer tube 16. The buffer tube 16 may then be subsequently formed about the coupling element 18. In any configuration, it may be desirable for the coupling element 18 to substantially encircle the optical fiber element 12 so that the optical fiber element 12 is supported within the buffer tube 16 by the raised members 22.

The coupling element 18 should be secured to the buffer tube 16, whether directly or via connection to another element secured to the buffer tube 16 (e.g., to a water-swellable element 14 bonded to the buffer tube 16). This may be accomplished by inserting an adhesive material (e.g., a thermoplastic or thermoset material) between the coupling element 18 and the adjacent layer. Alternatively, the coupling element 18 may be melt-bonded to the buffer tube 16 during co-extrusion formation of the optical fiber cable 10. In another variation, the coupling element 18 may be frictionally coupled to the buffer tube 16.

A water-swellable element 14 may also be included in the optical fiber cable 10 (e.g., at least partly around the coupling element 18) to help prevent the ingress of water into the core of the optical fiber cable 10 or, if water intrusion occurs, helps to prevent the movement of water along the length of the optical fiber cable 10. Various dry water-blocking materials are known in the art. For example, the water-swellable element 14 may be a water-swellable tape positioned between the inside wall of the buffer tube 16 and the coupling element 18.

Alternatively, the water-swellable element 14 may include water-swellable yarns positioned between the raised members 22 of the coupling element 18. This configuration uses less water-swellable materials to perform the desired water-blocking function. Further, by alternating the water-swellable element 14 and coupling element 18 about the inner surface of the buffer tube 16 rather than stacking the elements on top of each other, thinner buffer tubes may be constructed while retaining significant coupling and water-blocking functions.

In still another variation, the coupling element 18 may itself possess water-blocking characteristics, thereby reducing if not eliminating the need for a separate water-blocking element. For instance, the coupling element 18 might be formed from water-swellable materials or a blend thereof (e.g., a blend of water-swellable polymers and non-water-swellable polymers). In this regard, exemplary water-swellable materials include a matrix (e.g., ethylene vinyl acetate or rubber) enhanced with about 30-70 weight percent super absorbent polymers (SAPs), such as particulates of sodium polyacrylate, polyacrylate salt, or acrylic acid polymer with sodium salt. Such water-swellable materials can be processed on conventional hot melt adhesive machinery. An exemplary water-swellable material, which can be further blended with non-water-swellable polymeric material to enhance its elasticity, is available from the H.B. Fuller Company under the trade name HYDROLOCK.

Alternatively, the coupling element 18 can be enhanced with water-swellable particulate powders, which can be bound, for instance, to the surface of the coupling element 18, usually opposite the optical fiber element 12 to reduce the risk of optical attenuation (e.g., microbending) or glass degradation. Such powders are typically composed of super absorbent polymers (SAPs) that, when bound on or impregnated in the coupling element 18, are dry to the touch and, accordingly, are readily removed from cables during splicing operations. Moreover, the water-swellable particulate powders can be applied to the outer surface of the coupling element 18 (i.e., opposite the optical fiber element 12), either completely or partially (e.g., intermittently).

Additionally, reinforcing rods may be included in the optical fiber cable 10 to provide supplemental stiffness to the buffer tube 16, thereby inhibiting bending. The reinforcing rods, for instance, may be incorporated within the structure of the buffer tube 16. As will be known by those having ordinary skill in the art, reinforcing rods may be formed from glass-reinforced plastic. In this regard, exemplary glass-reinforced plastic (GRP) might include between about 80 and 90 weight percent glass.

The coupling element 18 may be provided in the optical fiber cable 10 in a number of different configurations. For example, the coupling element 18 may be substantially continuous along the length of the buffer tube 16. A lengthwise-continuous coupling element 18 ensures that coupling can be achieved at any point along the length of the optical fiber cable 10 and that the optical fiber element 12 is sufficiently protected from forced contact with the buffer tube 16 along the length of the buffer tube 16. Alternatively, the coupling element 18 may be spaced intermittently along the length of the buffer tube 16. The resulting intermittent segments in which the coupling element 18 is present should be spaced closely enough to effectively engage the optical fiber element 12 regardless of how the optical fiber element 12 twists or bends within the buffer tube 16. This configuration reduces the amount of material used to form the coupling element 18 yet maintains sufficient coupling of the optical fiber element 12 to the buffer tube 16.

Figure 13:
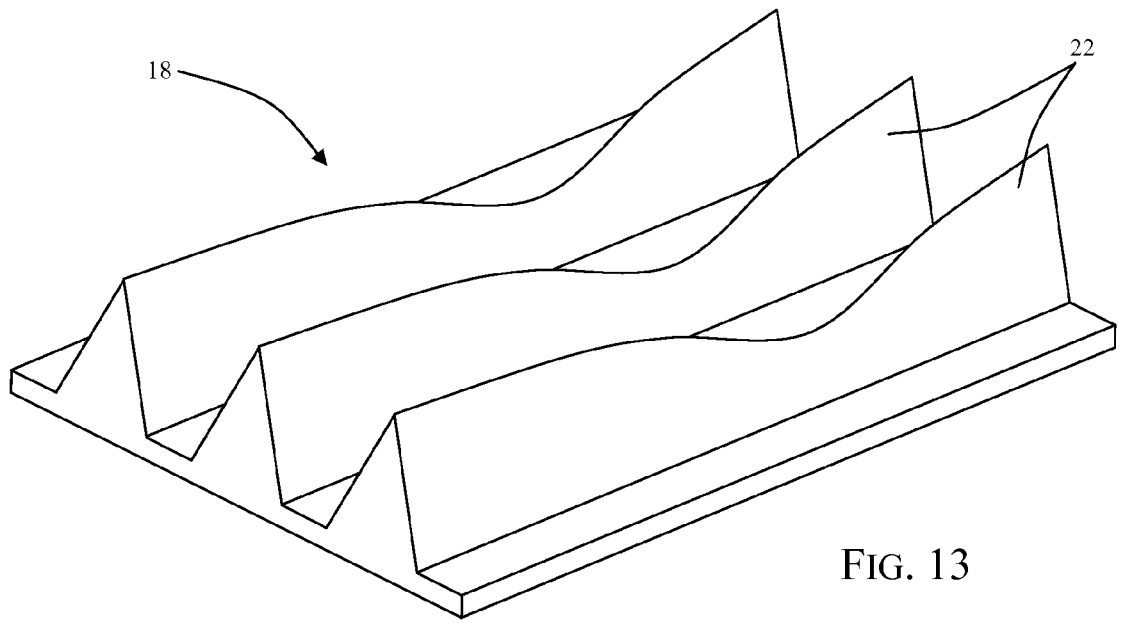
FIG. 13 depicts a perspective view of a coupling element according to one embodiment of the present invention.

A third variation bridges the gap between the lengthwise-continuous and intermittent coupling elements 18. The coupling element 18 of this variation is lengthwise continuous, but the height of the raised members 22 varies along the length. See FIG. 13. When the coupling element 18 is inserted or otherwise positioned into a buffer tube 16, it defines varying nominal coupling diameters along its length because of the varying height of the raised members 22. In other words, the nominal coupling diameter is larger where the raised members 22 have a relatively shorter height (i.e., "valleys" in the raised members 22). As a result, this coupling element configuration breaks the connection (i.e., interference contact) between the coupling element 18 and the optical fiber element 12 at certain intervals. These breaks may help provide a place for excess length of the optical fiber element 12 to gather. Additionally, the breaks may release any pressure caused by the twist of the optical fiber element 12, which forces the optical fiber element 12 against the relatively fixed raised members 22.

Those having skill in the art will recognize that these various configurations are effective in providing the necessary coupling both where the coupling element 18 is a separate insert secured to the buffer tube 16 or where it is formed directly on the buffer tube 16 (e.g., deposited segments).

The coupling element 18 may be provided as a plurality of raised members 22 (e.g., longitudinal ribs) formed along the length of the buffer tube 16. The raised members 22 project radially inward from the buffer tube 16 to the optical fiber element 12 to couple the optical fiber element 12 and the buffer tube 16. Except for space considerations, the coupling element 18 is not limited in the number of raised members 22 it may possess but typically includes between one and 16 (e.g., 2-12), more typically fewer than eight (e.g., 3-5). The raised members 22 may be substantially continuous longitudinal ribs formed on the buffer tube 16 substantially parallel to the central longitudinal axis of said buffer tube 16. Alternatively, the raised members 22 (e.g., ribs) may wind helically around the optical element 12, thereby distributing the coupling force about the perimeter of the optical fiber element 12. A water-swellable element 14 may also be provided in the buffer tube 16. For example, a water-swellable tape or yarn may be disposed between the raised members 22.

In any configuration, the gaps between the raised members 22 should not be so great as to readily permit the optical fiber element 12 to become positioned between the strips and, possibly, to contact the water-swellable element 14 or the buffer tube 16. In other words, the raised members 22 should be positioned about the optical fiber element 12 such that the distance between adjacent raised members 22 is less than the minimum width of the optical fiber element 12.

As noted, in another aspect, the invention embraces methods for making the optical fiber cable 10 as previously described.

The method typically includes forming an enclosed buffer tube 16, positioning an optical fiber element 12 having at least one optical fiber within the buffer tube 16, and positioning a coupling element 18 having a plurality of raised members 22 between the optical fiber element 12 and the buffer tube 16. The method may further include positioning a water-swellable element 14 between the coupling element 18 and the buffer tube 16.

The coupling element 18, which is typically formed from a deformable yet substantially incompressible material, is configured to define coupling space within the optical fiber cable 10 (i.e., between the ends of the raised members 22). As used herein, the concept of "coupling space" refers to the inner cable region (i.e., the free space) in which the optical fiber element 12 is positioned. As will be recognized by those having ordinary skill in the art, the coupling space is typically defined by the configuration of the coupling element 18.

In this regard, the coupling element 18 is usually positioned between the optical fiber element 12 and the buffer tube 16 such that, at a cross-section of the optical fiber cable 10, the elements are positioned relative to each other so that the optical fiber element 12 is in interference contact with one or more of the raised members 22. This interference contact should be sufficient to bend one or more of the raised members 22.

Stated differently, the coupling element 18 may be sized to define a nominal coupling diameter that is less than the minimum width of the optical fiber element 12 such that one or more raised members 22 of the coupling element 18 are laterally displaced.

The steps of forming an enclosed buffer tube 16 and positioning an optical fiber element 12 within the buffer tube 16 may embrace, for instance, extruding the buffer tube 16 around the optical fiber element 12. Those having ordinary skill in the art will appreciate that the buffer tube 16 can be formed from various polymeric materials, such as polyethylene or polypropylene.

The step of positioning a coupling element 18 between the optical fiber element 12 and the buffer tube 16 may be achieved, for instance, by co-extruding the coupling element 18 and buffer tube 16 around the optical fiber element 12.

Alternatively, the step of positioning the coupling element 18 between the optical fiber element 12 and the buffer tube 16 may embrace placing a plurality of strips of deformable yet substantially incompressible material along the length of the buffer tube's internal surface 16. These strips of coupling material may be continuous or discontinuous (i.e., dash-like segments) along the length of the buffer tube 16.

Further still, the steps of forming the enclosed buffer tube 16, positioning the coupling element 18 between the optical fiber element 12 and the buffer tube 16, and positioning a water-swellable element 14 between the coupling element 18 and the buffer tube 16 may involve co-extruding the outer buffer tube 16, the water-swellable element 14, and the coupling element 18 around the optical fiber element 12.

Another method for making an optical fiber cable 10 includes the steps of forming an enclosed buffer tube 16, positioning an optical fiber element 12 (e.g., at least one optical fiber) within the buffer tube 16, and positioning a deformable yet substantially incompressible coupling element 18 between the optical fiber element 12 and the buffer tube 16. The coupling element 18 has raised members 22 that are configured such that the coupling element 18 defines a nominal coupling diameter. For at least one cross-section of the optical fiber cable 10, the nominal coupling diameter is sufficiently smaller than the minimum width of the optical fiber element 12 so as to require lateral displacement of one or more of the raised members 22. In a variation on this method, the coupling element 18 is sized such that the nominal coupling diameter is smaller than the minimum width of the optical fiber element 12 for every cross-section of the optical fiber cable 10.

The step of positioning the coupling element 18 between the optical fiber element 12 and the buffer tube 16 may be achieved by placing a plurality of continuous strips of deformable yet substantially incompressible material along the length of the buffer tube's internal surface. The plurality of continuous strips may be intermittently spaced about the cross-sectional perimeter of the optical fiber element 12. This step may form, for instance, the exemplary optical fiber cable 10 depicted in FIG. 2.

Alternatively, the strips of deformable yet substantially incompressible material placed along the length of the buffer tube's internal surface may be intermittently spaced (i.e., discontinuous strips). Like the previous alternative, discontinuous strips may be intermittently spaced about the cross-sectional perimeter of the optical fiber element 12.

In either method of this embodiment, a water-swellable element 14 may be positioned between the strips of deformable yet substantially incompressible material.

Alternatively, a water-swellable element 14 may be positioned as a layer between the coupling element 18 and the buffer tube 16. To achieve this configuration, the outer buffer tube 16, water-swellable element 14, and inner coupling element 18 having raised members 22 can be co-extruded in a single step.

Still another method of constructing an optical fiber cable 10 includes the step of forming a core from a substantially incompressible coupling element 18 having raised members 22, which is placed around an optical fiber element 12 having at least one optical fiber.

In forming the core, a water-swellable element 14 may further be positioned around the coupling element 18. The core is then enclosed within a buffer tube 16 to form the optical fiber cable 10. The method may further include the step of securing the coupling element 18 to the buffer tube 16 (e.g., by applying an adhesive, by melt-bonding, or by frictional coupling).

The step of forming the core may be completed in various ways. For instance, deformable yet substantially incompressible material may be extruded (e.g., metered) around the optical fiber element 12. In another way, the coupling element 18 may be a tape of deformable yet substantially incompressible material that is bent, wrapped, or otherwise shaped to form a tube around the optical fiber element 12 (e.g., the sides of the tape may be bonded to form a convolute structure about the optical fiber element 12).

In yet another way, the steps of forming the core and enclosing the core within a buffer tube 16 may be performed together. In this regard, the coupling element 18 may be a plurality of lengthwise strips of deformable yet substantially incompressible material positioned about the cross-sectional perimeter of the optical fiber element 12 and secured to the buffer tube 16. The elements may be secured together, for example, by applying an adhesive between the buffer tube 16 and the core or by melt-bonding the coupling element 18 to the buffer tube 16.

In yet another way, the core (or a portion thereof) can be inserted into a pre-extruded, pre-slit buffer tube 16. For example, a "plow" device may be used to open the pre-slit buffer tube to facilitate the insertion of the core or a portion thereof (e.g., an embedded optical fiber element 12). If deemed necessary, a tape can then be applied over the buffer tube slit, or the slit can be welded closed. Alternatively, the core might be blown or pushed (e.g., jetted) into the buffer tube 16, at least over moderate distances.

Regardless of how the core is formed, though, for at least one cross-section of the core, the coupling element 18 should define a nominal coupling diameter that is sufficiently less than the minimum width of the optical fiber element 12 so as to cause the lateral displacement of one or more raised members 22.

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. An optical fiber cable, comprising:
   an optical fiber element including one or more optical fibers;
   a buffer tube enclosing said optical fiber element; and
   a substantially incompressible coupling element positioned between said optical fiber element and said buffer tube, said coupling element including raised members inwardly projecting toward said optical fiber element;
   wherein, at a cable cross-section that includes said coupling element, (i) said coupling element defines a nominal coupling diameter that is less than the maximum width of said optical fiber element and (ii) one or more of said raised members are in sufficiently forced contact with said optical fiber element to become displaced.

2. An optical fiber cable according to claim 1, wherein, at a cable cross-section that includes said coupling element, one or more of said raised members are in sufficiently forced contact with said optical fiber element to become laterally displaced.

3. An optical fiber cable according to claim 1, wherein, at any cable cross-section that includes said coupling element, one or more of said raised members are in sufficiently forced contact with said optical fiber element to become displaced.

4. An optical fiber cable according to claim 1, wherein, at any cable cross-section that includes said coupling element, one or more of said raised members are in sufficiently forced contact with said optical fiber element to become laterally deformed.

5. An optical fiber cable according to claim 1, wherein:
   a plurality of said raised members of said coupling element are deformable and possess an elongation to break of at least about 100 percent and a tensile strength of at least about 100 psi at standard temperature and pressure; and
   at a cable cross-section that includes said coupling element, the nominal coupling diameter is less than the minimum width of said optical fiber element.

6. An optical fiber cable according to claim 1, wherein, at a cable cross-section that includes said coupling element, at least one of said raised members tapers inwardly to an end adjacent to said optical fiber element.

7. An optical fiber cable according to claim 6, wherein, at a cable cross-section that includes said coupling element, each of said raised members tapers inwardly to an apex.

8. An optical fiber cable according to claim 6, wherein, at a cable cross-section that includes said coupling element, said raised members inwardly projecting toward said optical fiber element comprise (i) at least one relatively longer primary raised member that tapers inwardly to an apex and (ii) at least one relatively shorter secondary raised member.

9. An optical fiber cable according to claim 1, wherein:
   said optical fiber element comprises a plurality of optical fibers configured as a twisted ribbon stack;
   said coupling element comprising substantially incompressible raised members projecting radially inward to said optical fiber element;

wherein, at a cable cross-section that includes said coupling element, said raised members taper inwardly to an apex adjacent to said optical fiber element; and wherein, one or more of said raised members are in sufficiently forced contact with said optical fiber element to become laterally deformed.

10. An optical fiber cable according to claim 1, wherein said coupling element comprises a water-swellable material.

11. An optical fiber cable according to claim 1, further comprising a water-swellable element, said coupling element being at least partly positioned between said optical fiber element and said water-swellable element.

12. An optical fiber cable according to claim 1, wherein said coupling element substantially encircles said optical fiber element.

13. An optical fiber cable according to claim 12, wherein said coupling element is continuous along the length of said buffer tube.

14. An optical fiber cable according to claim 12, wherein said coupling element is spaced intermittently along the length of said buffer tube.

15. An optical fiber cable according to claim 1, wherein said raised members comprise between one and sixteen ribs formed along the length of said buffer tube.

16. An optical fiber cable according to claim 1, wherein said coupling element comprises a blend of (i) elastomeric block copolymers having a number-average molecular weight of at least about 200,000 g/mol and (ii) hydrocarbon oil possessing a pour-point of −25° C. or less and absorbability in polyethylene or polypropylene of less than 20 percent, said blend possessing a melt flow temperature of at least about 80° C.

17. An optical fiber cable according to claim 1, wherein said coupling element comprises a blend of (i) SEBS block copolymers having a number-average molecular weight of at least about 200,000 g/mol and (ii) polyalphaolefin (PAO) oil possessing a pour-point of less than about −30° C. and absorbability in polyethylene or polypropylene of less than 10 percent.

18. A method for making the optical fiber cable according to claim 1, comprising:

forming the enclosed buffer tube;

positioning the coupling element within the buffer tube so as to define coupling space within the optical fiber cable; and positioning the optical fiber element within the buffer tube;

wherein the step of positioning the coupling element within the buffer tube and/or the step of positioning the optical fiber element within the buffer tube comprise initiating interference contact between the optical fiber element and the coupling element sufficient to bend one or more of the raised members.

* * * * *